United States Patent [19]

Primeau

[11] 4,191,171

[45] Mar. 4, 1980

[54] DRAFT HOOD AND DAMPER ASSEMBLY FOR FUEL FIRED HEATING APPARATUS

[76] Inventor: John J. Primeau, 19800 Seminole, Euclid, Ohio 44117

[21] Appl. No.: 891,320

[22] Filed: Mar. 29, 1978

[51] Int. Cl.² ............................ F23L 3/00; F16K 1/00
[52] U.S. Cl. .................................... 126/292; 110/163; 126/296; 137/614.11; 251/304
[58] Field of Search ........... 126/290, 296, 292, 285 R; 110/163; 137/614.11, 614.15, 614.18; 251/304, 315, 211

[56] References Cited

U.S. PATENT DOCUMENTS

| | | | |
|---|---|---|---|
| 404,702 | 6/1889 | Greenlee | 126/296 |
| 713,055 | 11/1902 | Burton | 126/296 |
| 1,373,960 | 4/1921 | Forcier | 126/296 |
| 2,116,648 | 5/1938 | Tapley | 126/296 |
| 2,261,535 | 11/1941 | Wheatley | 137/614.11 |
| 2,997,057 | 8/1961 | Toth | 137/614.11 |
| 3,111,136 | 11/1963 | Persidsky | 251/304 |
| 4,103,708 | 8/1978 | Huntington | 137/614.11 |

Primary Examiner—James C. Yeung
Assistant Examiner—Daniel J. O'Connor

[57] ABSTRACT

A damper assembly for association with the draft hood of a fuel fired heating appliance to control flow of exhaust gases through both the flue tube and the vent pipe. The assembly comprises a pair of damper members shaped to conform to the cross-section of the inlets and outlets of the draft hood. The damper members are spaced apart a distance equal to the distance between the inlet and outlet and carried from a single mounting shaft which extends transversely into the draft hood generally midway between the inlet and outlet openings. Suitable power means are provided to rotate the damper members from a first position in which they are in alignment with the inlet and outlet openings to a second position wherein they are out of alignment and permit free flow of exhaust gases.

11 Claims, 4 Drawing Figures

DRAFT HOOD AND DAMPER ASSEMBLY FOR FUEL FIRED HEATING APPARATUS

BACKGROUND OF THE INVENTION

Currently there is substantial interest in simultaneously controlling the flow of exhaust gases and building air through both the flue tube and the vent pipe of fuel fired heating appliances such as gas fired water heaters. The reason for this interest is that substantial energy losses take place by the flow of building air through the appliance's flue tube and exhaust hood during periods in which the appliance burner is not firing. This air flow not only cools the interior and contents of the appliance but causes heated building air to escape to the exterior of the building.

Many different damper arrangements have been proposed to control this flow. Typically, these prior damper assemblies have required substantial redesign of the appliance's draft hood and have entailed somewhat complicated mounting arrangements. Additionally, in order to achieve the proper flow through and around these assemblies it has generally been necessary to substantially increase the size of the draft hood portion of the appliance.

BRIEF DESCRIPTION OF THE INVENTION

The present invention provides a damper assembly which is extremely simple in construction and does not require major redesign or size increases in the draft hood. Additionally, the assembly is such that the flow through the draft hood is unimpeded when the dampers are moved to their open position. In particular, this assembly comprises a pair of damper elements shaped to conform generally to the inlet and outlet openings of the draft hood.

The damper elements are spaced apart a distance equal to the distance between the draft hood inlet and outlet openings. Additionally, they are mounted from a rotatable shaft which extends transversely into the draft hood at a point generally mid-way between the inlet and outlet openings. The draft hood assembly itself is sized so that the damper members can be rotated from a first position in which they are in alignment with, and generally blocking, the inlet and outlet openings, to a second position in which they are located laterally on opposite sides of the flow path through the draft hood.

Because of this arrangement, the flow through the draft hood is unimpeded since the damper members are moved completely out of the flow path. Additionally, the normal functioning of the draft hood is not significantly affected because when the dampers are in the open position flow can take place freely through the lateral openings.

Accordingly, a primary object of the invention is the provision of a simplified damper assembly for controlling flow through the inlet and outlet openings of a draft hood.

Yet another object of the invention is the provision of a damper assembly of the type described which does not require any major redesign or changes in the typical draft hood construction.

A still further object is the provision of a double damper assembly in which both dampers are commonly mounted and movable from an open to a close position by a simple rotary motion.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
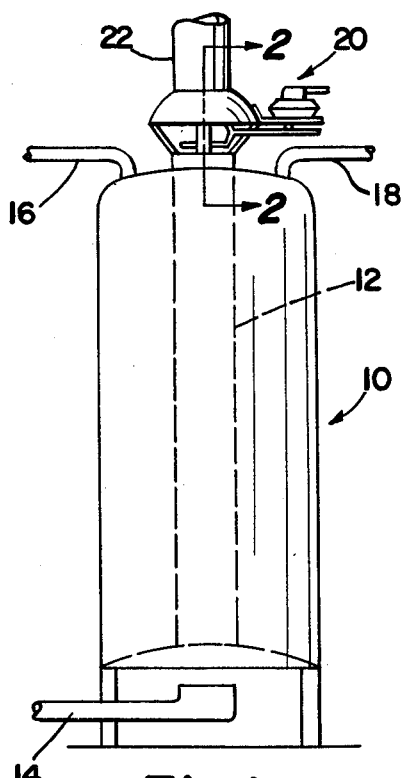
FIG. 1 is a side view, somewhat diagrammatic, of a typical fuel fired water heater incorporating a draft hood and damper assembly formed in accordance with the preferred embodiment of the subject invention.

Referring more particularly to the drawings wherein the showings are for the purpose of illustrating a preferred embodiment at the invention only, and not for the purpose of limiting same, FIG. 1 shows, in somewhat diagrammatic form, a typical fuel-fired water heater incorporating a draft hood and damper assembly formed in accordance with the preferred embodiment of the invention. As should be appreciated, the details of the water heater form no particular part of the invention and have been illustrated merely to show one environment in which the invention can operate. Obviously, the invention could be used with many different types of fuel-fired heating appliances or devices of the type incorporating or requiring a draft hood. Merely for background, it should be noted that the water heater illustrated comprises a vertically extended tank 10 having a centrally positioned exhaust gas flue tube 12 and a diagrammatically illustrated burner 14 fired with natural gas or the like. Suitable water inlet supply and discharge lines 16 and 18 are illustrated. It should be appreciated that suitable temperature controls and burner safety devices, not shown, would normally be included.

Mounted at the upper end of the flue tube 12 is a draft hood and damper assembly 20 formed in accordance with a preferred embodiment of the invention and arranged to function to block flow through the flue tube 12 and the vent pipe 22 during periods when the damper is not firing.

Figure 2:
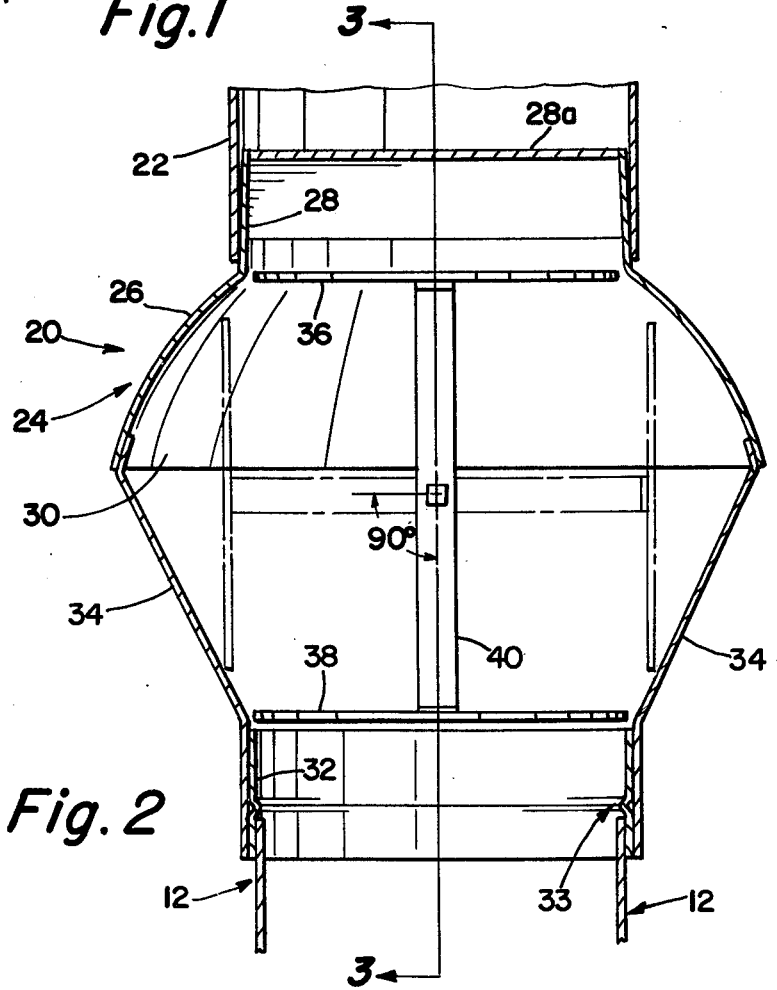
FIG. 2 is a cross-sectional view taken on line 2—2 of FIG. 1.
Figure 3:
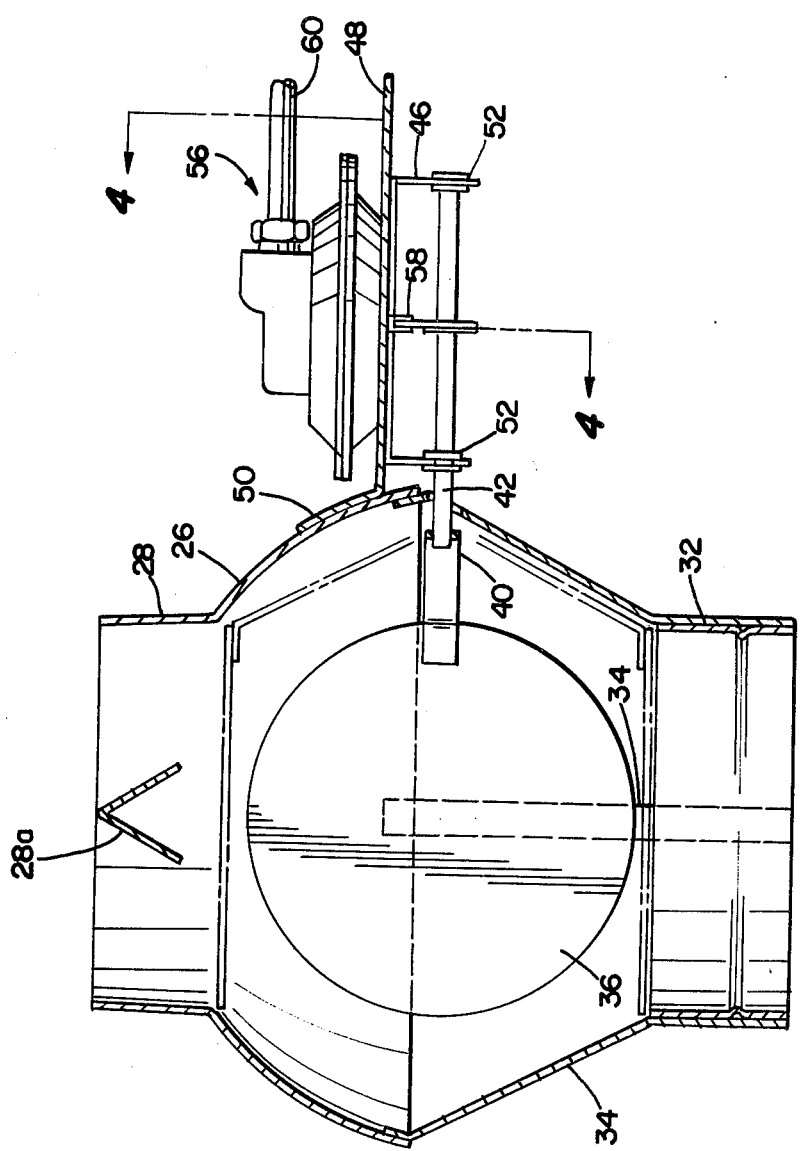
FIG. 3 is a view taken on line 3—3 of FIG. 2.

The preferred construction of the draft hood and damper assembly 20 is best seen in FIGS. 2 and 3. Referring, in particular, to FIG. 2 it will be seen that assembly 20 comprises a first hood forming member 24 having a skirt of generally truncated conical shape 26 and an upper tubular portion 28 and a downdraft splitter plate 28a adapted to be received within the lower end of the vent pipe 22. The tube portion 28 defines the outlet from the hood assembly 20. As shown, the flared skirt portion 26, is open at its lower end 30 and axially aligned with a short tubular section 32 which is received by the upper end of the flue pipe 12 which is positioned suitably by slip-on stop 33. Tubular member 32 defines the inlet for the draft hood assembly 20 and the outlet for the flue tube.

In the embodiment under construction, the hood portion 24 and the tubular portion 32 are maintained in a desired spaced relationship and formed as a unitary assembly by suitable support or leg members 34. As will become apparent hereafter, the portions 24 and 32 could be separate or integrally formed on the vent pipe 22 and the flue tube 32 respectively. The damper assembly for simultaneously closing both the exit from the hood assembly and the inlet thereto comprises a pair of damper elements or members 36, 38, respectively. In the embodiment shown the members 36, 38 are formed from any heat and corrosion resistant suitable material such as sheet metal and have a configuration adapted to closely conform to the circular shape of the tube sections 28, 32, respectively. As shown, the members 36, 38 are spaced apart a distance corresponding to the spacing of the inlet and outlet portions of the assembly. They are connected in this spaced relationship by a bracket member 40 which is suitably joined to each of the members 36, 38 along a peripheral edge portion thereof.

The damper members are supported from a shaft 42 which extends transversely into the hood assembly and is suitably joined to the bracket member 40 generally at its midpoint as best shown in FIG. 3. With the arrangement thus far described, the damper members 36, 38 can be moved from the solid line position of FIG. 2 to the solid line position of FIG. 3 by a 90 degree rotation of shaft 42. While in the solid line position of FIG. 2, the damper 38 prevents the flow of appliance warmed air through the flue tube 12. Similarly, the damper member 36 prevents building air from passing up the vent tube 22. This arrangement prevents cooling of the water in the tank 12 as well as preventing loss of heated building air up the vent tube or pipe 22.

It should be noted that while in the solid line open position of FIG. 3 the damper members offer no impedence to flow from the flue tube 12 to the vent tube 22. Additionally, their position offers substantially no resistance to down-draft flow outwardly under the hood portion 26. Consequently, this extremely simple damper arrangement offers the described advantages with substantially no change in the functioning of the draft hood.

Many different types of operating or actuating assemblies could be used for rotating the damper members between the two described positions. In the subject embodiment, however, the shaft 42 is supported from a generally U-shaped bracket 46 which is carried on the underside of a support plate 48. As shown, the support plate 48 has a leg portion 50 which is suitably connected to the skirt portion 26 of the first hood member 24. The shaft 42 is suitably supported in bearings 52 for free rotation relative to the bracket 46.

Selective rotation of the shaft 42 and the damper elements 38 and 36, could be achieved with many types of power actuators either fluid, electric, or the like. In the subject embodiment, the actuator comprises a diaphram-type fluid motor 56 which is carried on the upper surface of the support plate 48 and has a downwardly extending output shaft 58. Suitable actuating or control fluid is supplied to the upper half of the diaphram motor 56 through lines 60.

Figure 4:
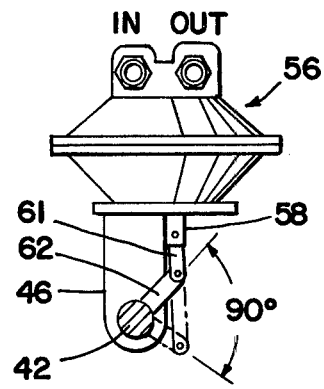
FIG. 4 is a cross-sectional view taken on line 4—4 of FIG. 3 and showing a drive connection between the actuator and the damper mounting shaft.

As best shown in FIG. 4, the output shaft 58 of the diaphram type motor 56 is pivotally connected to a link 61 which is in turn pivoted to the outer end of a small crank arm 62 positively joined to the shaft 42. Upon supply of actuating fluid to the motor 56 the output shaft 58 is moved downwardly driving the shaft 42 through a 90 degree rotation as required for movement of the dampers between their two positions.

The invention has been described in substantial detail with reference to a preferred embodiment. Obviously, modifications and alterations of the preferred embodiment will occur to others by a reading and understanding of this specification. It is my intention to include all such modifications and alterations as part of my invention insofar as they come within the scope of the appended claims.

The invention claimed is:

1. A damper assembly in a fuel fired heating apparatus of the type having a flue tube outlet aligned with a vent tube inlet spaced therefrom, said assembly including a flared draft hood forming member having an outlet end adapted to be connected to said vent tube inlet and a larger diameter inlet end adapted to be positioned in alignment with the outlet of said flue tube to receive exhaust gas coming therefrom; a first damper member having a configuration and size to conform to the outlet of said draft hood forming member; a second damper member having a configuration and size to conform to the outlet of said flue tube; rotatable shaft means extending in a direction transverse to the outlet of said draft hood member; mounting means connecting said first and second damper members to said shaft means in space apart relationship on opposite sides thereof; and actuating means for selectively rotating said shaft means from a first position wherein said first and second damper members are in position to respectively prevent flow through the outlet of said hood forming member and the outlet from said flue tube to a second position wherein said damper members are spaced laterally of the outlet from said hood forming member and the outlet from said flue tube.

2. The assembly as defined in claim 1 wherein said actuator is a fluid motor carried by said draft hood forming member.

3. The assembly as defined in claim 1 wherein said damper forming members are generally circular.

4. The assembly as defined in claim 3 including a tube section spaced from and aligned with the larger diameter end of said hood forming member and defining the outlet of the flue tube.

5. The assembly as defined in claim 4 wherein said tube section is connected with said hood forming by a plurality of support elements.

6. The assembly as defined in claim 5 wherein said shaft means is carried by said hood forming member at a location generally midway between the outlet from said hood forming member and said tube section.

7. A draft hood and damper assembly for use on a fuel fired heating apparatus said assembly including a flared draft hood forming member having an outlet end of a first diameter and an inlet end of a second diameter larger than said first diameter, a tube member having an outlet end of a diameter substantially less than said second diameter and generally axially aligned with said hood member and spaced from said inlet end to define a generally annular flow space about said tube to the inlet of said hood forming member; a first damper member having a configuration and size to conform to the outlet of said draft hood forming member; a second damper member having a configuration and size to conform to the outlet of said tube member; rotatable shaft means extending in a direction transverse to the outlet of said draft hood member; mounting means connecting said first and second damper members to said shaft means in spaced apart relationship on opposite sides thereof; and actuating means for selectively rotating said shaft means from a first position to respectively prevent flow through the outlet of said hood forming member and the outlet from said tube member to a second position wherein said damper members are spaced laterally of the outlet from said hood forming member and the outlet from said tube member.

8. The assembly as defined in claim 6 wherein said actuator is a fluid motor carried by said draft hood forming member.

9. The assembly as defined in claim 7 wherein said damper members are generally circular.

10. The assembly as defined in claim 8 wherein said tube member is connected with said hood forming member by a plurality of support elements.

11. The assembly as defined in claim 9 wherein said shaft means is carried by said hood forming member at a location generally midway between the outlet from said hood forming member and said tube section.

* * * * *